United States Patent [19]
Muller et al.

[11] Patent Number: 6,119,945
[45] Date of Patent: Sep. 19, 2000

[54] METHOD AND SYSTEM FOR STORING TICKETS ON SMART CARDS

[75] Inventors: Frank Muller, Delft; Michel Marco Paul Drupsteen, Ouderkerk a/d Amstel, both of Netherlands

[73] Assignee: Koninklijke KPN N.V., Groningen, Netherlands

[21] Appl. No.: 08/908,716

[22] Filed: Aug. 8, 1997

[30] Foreign Application Priority Data

Aug. 9, 1996 [EP] European Pat. Off. ............. 96202240

[51] Int. Cl.⁷ ................................................. G06K 19/06
[52] U.S. Cl. .......................... 235/492; 235/380; 235/383
[58] Field of Search .................................. 235/492, 382, 235/487, 441, 449, 493, 380, 375, 383, 385

[56] References Cited

U.S. PATENT DOCUMENTS

| | | | |
|---|---|---|---|
| 3,946,206 | 3/1976 | Darjany | 235/493 X |
| 3,947,660 | 3/1976 | Saito | 235/379 |
| 4,058,839 | 11/1977 | Darjany | 235/493 X |
| 4,108,365 | 8/1978 | Hughes | 235/419 |
| 4,211,919 | 7/1980 | Ugon | 235/487 |
| 4,855,578 | 8/1989 | Hirokawa et al. | 235/380 |
| 5,224,173 | 6/1993 | Kuhns et al. | 382/2 |
| 5,473,144 | 12/1995 | Mathurin, Jr. | 235/380 |
| 5,553,155 | 9/1996 | Kuhns et al. | 382/115 |
| 5,604,343 | 2/1997 | Curry et al. | 235/492 |
| 5,679,945 | 10/1997 | Renner et al. | 235/492 |
| 5,760,385 | 6/1998 | Curry et al. | 235/492 |

FOREIGN PATENT DOCUMENTS

| | | |
|---|---|---|
| 0 380 377 A1 | 8/1990 | European Pat. Off. . |
| 0 658 862 A2 | 6/1995 | European Pat. Off. . |
| 0 713 198 A2 | 5/1996 | European Pat. Off. . |
| 2 522 850 | 9/1983 | France . |
| 39 11 667 A1 | 10/1990 | Germany . |
| 9301902 | 6/1995 | Netherlands . |
| 2 267 626 | 12/1993 | United Kingdom . |
| WO 95/16245 | 6/1995 | WIPO . |

*Primary Examiner*—Michael G Lee
*Attorney, Agent, or Firm*—Oblon, Spivak, McClelland, Maier & Neustadt, P.C.

[57] ABSTRACT

In a smart card (1) electronic tickets (20) are securely stored. Ticket data is written into the fields (21, 22, 23) of a ticket (20) in a protected manner using a special code. Tickets (20) may comprise several fields, such as an entitlement field (21), a validation field (22), and a verification field (23). Different keys (K1, K2, K3) are used for each type of field at issuing, validation, and verification terminals (81, 82, 83). A further protection of the integrity of the tickets (20) is obtained by using a first storage command (UPDATE) to prepare a field when issuing the ticket (20) at the issuing terminal (81), and, a different, second storage command (WRITE) when validating the ticket (20) at the validation terminal (82). Thus, the fraudulent modification of an issued ticket (20) is prevented.

24 Claims, 6 Drawing Sheets

METHOD AND SYSTEM FOR STORING TICKETS ON SMART CARDS

BACKGROUND OF THE INVENTION

1. Field of the Invention

The present invention relates to a method and system for storing and using tickets with smart cards, and more particularly to the secure storage and usage of "open" tickets in smart cards, i.e tickets of which the particular date and/or time of use is left open when issuing the ticket. More specifically, the present invention relates to the secure storage, usage, validation and/or verification of tickets using smart cards, and to smart cards and a payment system arranged for use of the smart cards.

2. Discussion of Background

In recent years, smart cards have been used in many applications, such as an electronic purse, or in other applications requiring access rights to goods and/or services, such as identification (user verification), storing important data (e.g., medical data), and/or collecting loyalty credits. In addition, various types of tickets are used today, for example, tickets issued containing all relevant data, such as airline tickets, wherein the company (airline) involved, the price, the day of travel, the place and time of departure, and the place and time of arrival is provided and as such the tickets are ready for use. Another type of ticket is a ticket that is not ready for use, for example, a ticket where the day of travel needs to be filled in after the issuance of the ticket. Such an "open" ticket needs to be validated before it can be used, for example, by filling in the day of travel and possibly other data. Such an "open" ticket may be suitable for multiple use if it can be validated more than once.

Examples of tickets stored on smart cards are known and, for example, Dutch patent application NL 93 01902, discloses a method of obtaining a right to a service by means of a smart card (IC card), wherein the smart card is used for both payment and registration. That is, the smart card is used to store proof of payment of the service paid for, thus replacing paper tickets. The use of multiple tickets, i.e. tickets which may be used more than once, is also mentioned in the above patent application.

In the method of the above-described Dutch patent application, a ticket is stored on a card by registering on the card an access code, optionally in combination with a card identification code. At the terminal of, for example, a theater the access code and (optionally) the identification code are checked, whereupon the access code is erased from the card. However, in the above-mentioned Dutch patent application, the way in which multiple tickets are implemented and/or used is not disclosed, and a specific method for securely storing tickets on smart cards, especially tickets which may be validated after their issuance, is not provided.

European patent application EP 0 658 862 discloses a method and system for employing multi-functional smart cards by means of a communication system, for example, to allow airline tickets to be stored on the smart cards. The specific manner in which the tickets are stored is however not disclosed.

European patent application EP 0 380 377 discloses a system for electronic payment of transport and services by means of smart cards, wherein a ticket is disclosed having fields for stamping the ticket on a certain date at a certain time, and fields for storing data indicating that the ticket has been checked. However, the particulars of the way in which the ticket data is stored are not disclosed.

However, conventional electronic tickets are susceptible to fraud in that ticket data can untraceably be altered. Whereas fraudulent manipulations of paper tickets are often visible, or must be carried out very skillfully so as not to be visible, the alteration of bits on a smart card typically leaves no traces. Especially in the case of open tickets, where various stations "stamp" the ticket in order to perform a validation or verification, the possibility of fraud exists.

SUMMARY OF THE INVENTION

Accordingly, one object of this invention is to overcome the above-mentioned and other disadvantages of the prior art and to provide a smart card which allows tickets to be securely stored.

It is another object of the present invention to provide a smart card which virtually eliminates the possibility of the fraudulent issue or validation of tickets.

It is further object of the present invention to provide a smart card which allows secure "punching", i.e. secure traceable verification, of tickets.

It is a still further object of the present invention to provide a smart card which allows the use of secure open tickets, i.e. tickets which have no predetermined validity date or time.

It is a yet further object of the present invention to provide a method for securely storing tickets on smart cards, as well as a system in which the method is applied.

Accordingly, the present invention provides a smart card including an integrated circuit having a processor and a memory, the memory being structured so as to comprise tickets, with a ticket comprising at least one field for storing data relating to the ticket, and a means for securely storing data using a code containing a fixed number of set bits per group of bits.

By using a code containing a fixed number of set bits, the code can be easily verified (by the checking of the number of set bits of the code) if the data is correct, whereby fraud is effectively prevented. Preferably, the code comprises code words having eight bits, the number of set bits in each code word equaling four.

Advantageously, the ticket comprises an entitlement field and a validation field. By providing separate entitlement and validation fields it is possible to issue a ticket in two stages: first the ticket is issued by a first terminal, for example, with the date of validity left open, and at a later stage the ticket is validated by a second terminal, for example, by registering the date of validity in the validation field. In both types of fields, the above-mentioned code is used.

Preferably, a ticket according to the invention further comprises at least one verification field for storing verification data. A verification field offers the opportunity to register verification information, which may be issued by a third terminal. Although the first, second, and third terminals may be separate devices, in some applications they will be implemented in one terminal.

With respect to the coded storage of ticket data, the integrated circuit of the smart card is advantageously arranged for, when issuing the ticket, exclusively storing data in the validation field using a first command only capable of storing a first value (e.g., logical zero), and for, when validating the ticket, exclusively storing data in the validation field using a second command only capable of storing a second, different value (e.g., logical one). In this way, it is impossible to alter the entitlement during the validation or verification, or to alter the validation during verification.

BRIEF DESCRIPTION OF THE DRAWINGS

A more complete appreciation of the invention and many of the attendant advantages thereof will be readily obtained as the same becomes better understood by reference to the following detailed descriptions when considered in connection with the accompanying drawings, wherein.

DESCRIPTION OF THE PREFERRED EMBODIMENTS

Figure 1:
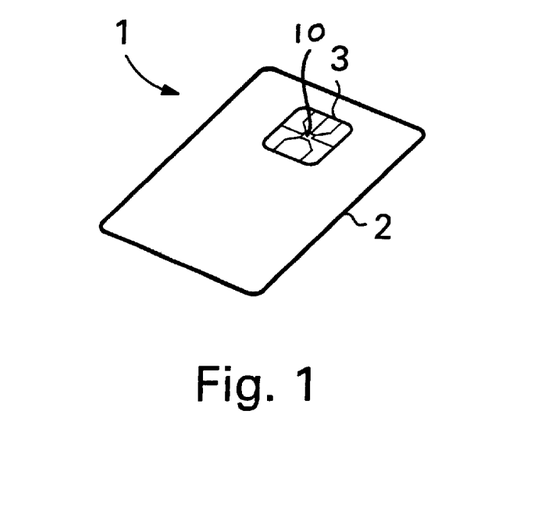
FIG. 1 is a schematic diagram showing a smart card, according to the present invention.

Referring now to the drawings, wherein like reference numerals designate identical or corresponding parts throughout the several views, and more particularly to FIG. 1 thereof, there is illustrated a smart card or IC card 1, including a substrate 2 in which an integrated circuit 10 is embedded. The integrated circuit 10, which will be further described with reference to FIG. 2, includes contacts 3 for providing electrical contacting with a card reader or the like. It should be noted that the present invention can also be applied to so-called contactless smart cards.

Figure 2:
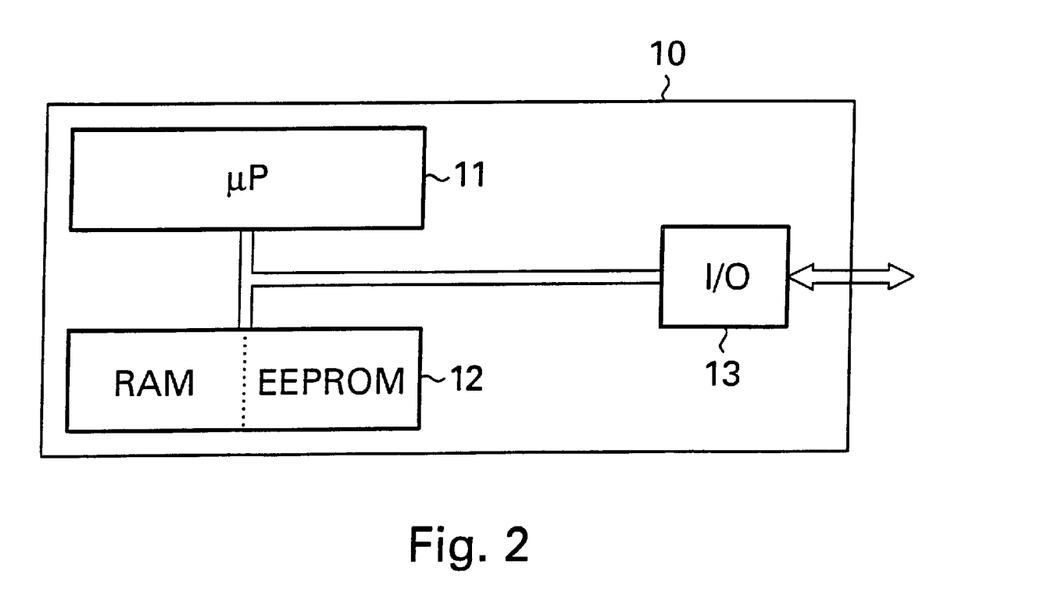
FIG. 2 is a block diagram showing the integrated circuit of the smart card of FIG. 1.

The integrated circuit 10 shown in the block diagram of FIG. 2 includes a processor 11, a memory 12 and an input/output circuit 13. The memory 12 comprises a volatile (RAM) memory device for temporarily storing data and a non-volatile (ROM) memory device for permanently or semi-permanently storing data. The ROM device is preferably an EEPROM type memory. The data stored in the non-volatile device may contain both programming data (instructions, programs) and payment data, i.e. data relating to monetary transactions. In addition, a separate memory (not shown) can be provided to store the instruction set of the processor 11.

Figure 3:
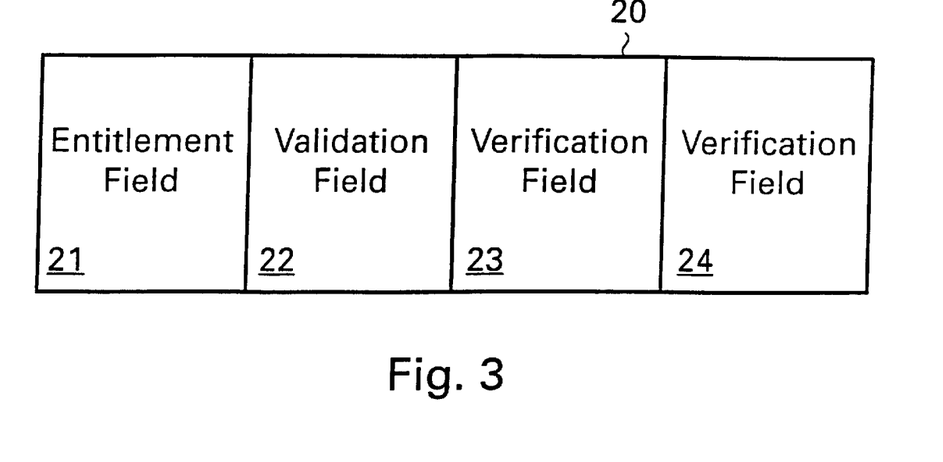
FIG. 3 is a diagram showing the structure of the fields used for storing a ticket in the smart card, according to the present invention.

FIG. 3 shows fields for implementing a ticket 20, according to the present invention, including, for example, an entitlement field 21, a validation field 22, and two verification fields 23 and 24. In practice, the ticket 20 can include additional fields which are not shown in FIG. 3. Also, the ticket 20 may include only one verification field, or more than two verification fields, e.g. three, five or ten verification fields. The ticket 20 is implemented, for example, by assigning memory locations in the memory 12 to the respective fields, and the memory locations need not be adjacent.

The entitlement field 21 contains the description of the ticket including, for example, the identity of the ticket issuer, the scope of validity (e.g., an expiry date, the maximum length of a trip, etc.), the number of persons the ticket is valid for, and/or a starting point and destination of a trip, although some of this data may be entered in the validation field 22 after the issuance of the ticket. The entitlement field 21 comprises, for example, 25 bytes of memory.

The validation field 22 is reserved for information which may be added later to the ticket, such as a starting time and/or date of validity. The entitlement field 21 and the validation field 22 taken together should contain sufficient data for the ticket to be valid while the actual relative allocation of data to these two fields may vary. The validation field 22 comprises, for example, 12 bytes of memory.

The verification fields 23 and 24 are reserved for information which is added during the use of the ticket, such as the date, the time, and a terminal identification. A code identifying a particular means of transportation (e.g., a train code) can also be added. The verification fields 23 and 24 comprise, for example, 22 bytes of memory each.

With the validation field 22, an "open" ticket which is completed at a later point in time is provided according to the present invention. At the moment of issuance, only the essential data is entered in the entitlement field 21. At the moment of validation, the ticket is completed by entering the remaining data (such as a date of validity) in the validation field 22. The verification fields 23 and 24 allow a proof of verification to be entered in the ticket (e.g., verification stamp). Such verification provides proof of use of the ticket, and proof of presence of the card (or card holder) at a certain location and at a certain point in time, etc.

In order to provide a secure storage and to virtually eliminate the possibility of fraudulent alteration of tickets, data is advantageously stored in the fields of a ticket, according to the present invention, using one or more of the following protective measures:

a. using a special code to store data, b. using different commands to store data, depending on the particular stage of providing a ticket (issuance, verification or validation), c. using different keys to store data in different fields, depending on the particular stage of the ticket processing.

The special code will now be explained with reference to FIG. 4, wherein an example of a preferred representation of data in the fields 21–24 of the ticket 20 of FIG. 3 is shown. Data word 31 comprises eight bits, all of which are (logical) zero. Accordingly, the sum S of the bits is zero. Data word 32 also comprises eight bits, four of which are (logical) one, also referred to as an "eight over four code". The sum S of the bits accordingly equals four. In the tickets of the present invention, the data in the fields 21–24 are stored using a code in which a fixed number of bits equals one. In other words, a code is used, for example, as in data word 32, wherein the sum of the bits is fixed (e.g., S=4). This allows an easy detection of alterations of the stored data. Data word 33, for example, is equal to data word 32 except for one bit which is a one instead of a zero (right-most bit). Accordingly, the sum (S) of the bits of data word 33 equals five rather than four. In this way, if a code is used in which all data words have a sum S equal to four, the additional logic one bit in data word 33 can readily be detected by determining the sum of the bits in data word 33.

Figure 4:
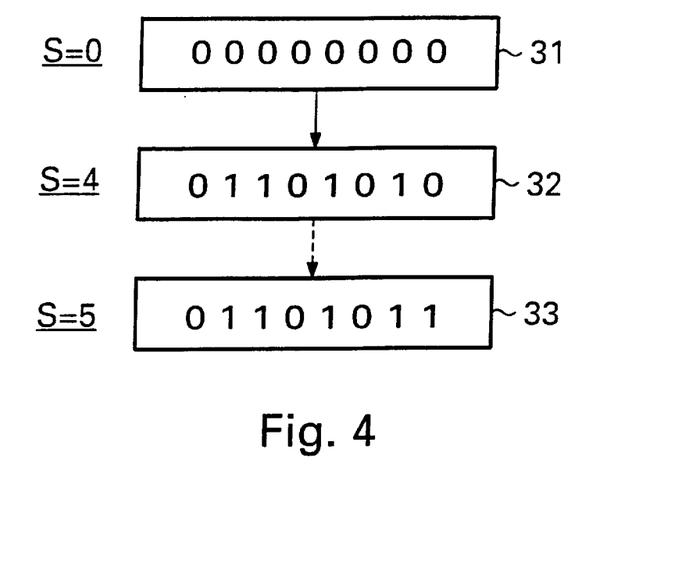
FIG. 4 is a diagram showing the way in which the ticket fields are coded, according to the present invention.

Accordingly, in the example of FIG. 4, three types of data words may be distinguished, based on the sum S of their respective bits. For data words, such as data word 31, S equals zero signifying words which are empty or contain no data. For data words, such as data word 32, S equals four signifying words containing valid data. For data words, such as data word 33, S equals neither zero nor four signifying words containing invalid data. It should be noted that the number of ones and zeros shown in FIG. 4 are by way of example only, and data words can be used which contain, for example, eight or ten bits, three or five of which are equal to one to signify valid data.

The present invention, advantageously, uses different commands to store data at different stages of providing a ticket. The smart card 1 supports, for example, a first write command (e.g., called UPDATE) to store ones and zeros in a memory location, and a second write command (e.g., called WRITE) to store only ones. During the issuing stage of providing a ticket, the fields of the ticket are provided with data using the first command (UPDATE). In this stage, in the entitlement field 21 relevant data is stored, while in the validation field 22 and the verification fields 23 and 24 zero-only words are written (e.g., such as data word 31 in FIG. 4). During the validation and verification stages, only the second command (WRITE) may be used, and therefore only ones can be written. This means that the valid code words which have already been written cannot be altered during the validation and verification stages, as this would require a zero to be written. Thus, by allowing only the second command (WRITE) to be used during validation and verification, the tampering of ticket data is prevented.

It should be noted that an empty (i.e., non-issued) ticket should contain invalid data, i.e., data containing more than four ones per word if an eight over four code is used, in order to prevent an empty ticket to be "issued" using the second write command (WRITE). Advantageously, an empty ticket contains only ones.

In order to provide further protection, preferably different keys are used to store data in different fields, depending on the particular stage of providing a ticket. Thus the issuance of a ticket (use of the first write command UPDATE) requires a first key K1 corresponding to the issuing terminal, the validation requires a second key K2 corresponding to the validation terminal, and the verification requires a third key K3 corresponding to the verification terminal. The smart card according to the present invention is preferably arranged so as to provide access to all fields 21–24 of a ticket 20 when the first key K1 is used at the issuing terminal, while only providing write access to the validation field 22 when the second key K2 is used at the validation terminal. Similarly, the third key K3 only provides storage access to the verification fields 23 and 24 the verification terminal. Optionally, the third key K3 only provides storage access to the first verification field 23, while a fourth, key K4, exclusively provides write access to the second verification field 24. It will be understood that all keys provide read access to all fields of the ticket 20. The use of at least three keys thus makes it possible to provide limited access to the various fields and to restrict the use of the first write command (UPDATE) by requiring the key K1 form the issuing terminal.

Figure 5:
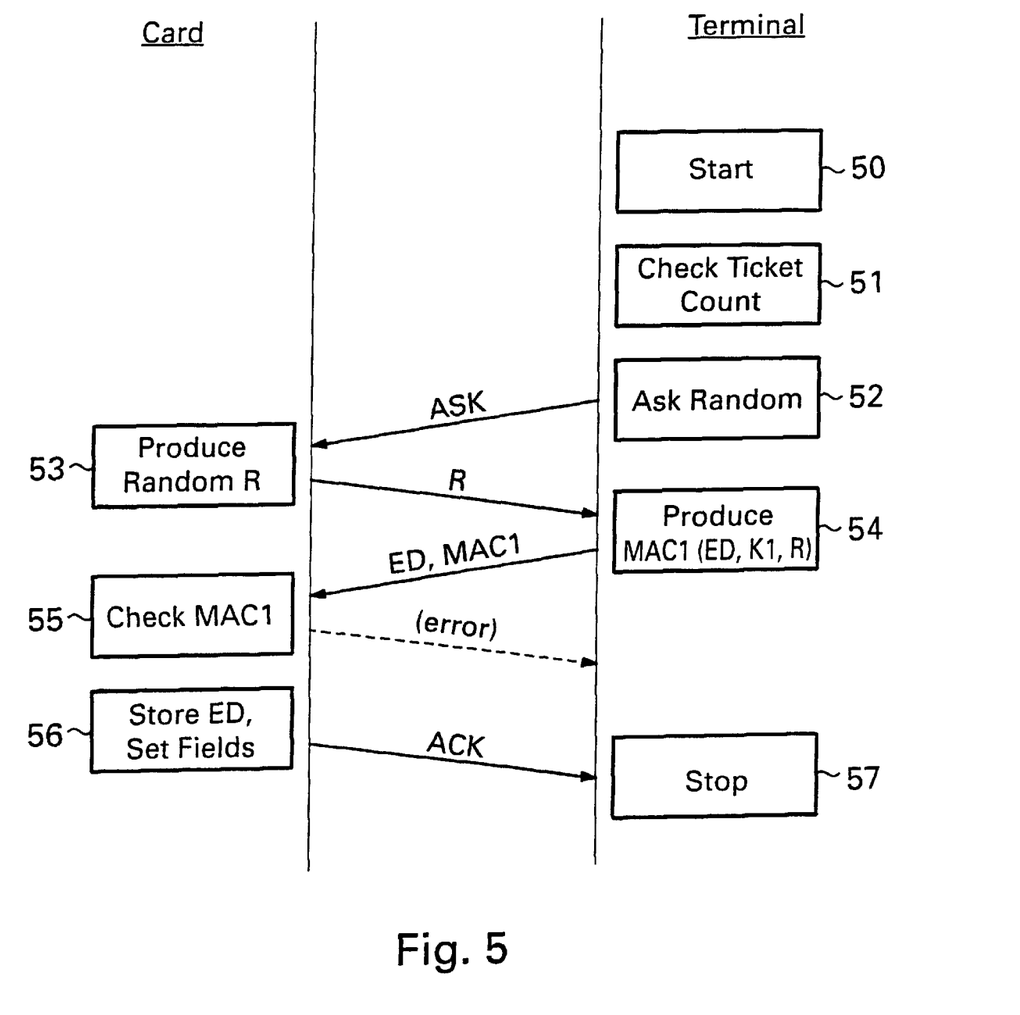
FIG. 5 is a timing diagram showing the timing for the issuance of a ticket, according to the present invention.
Figure 6:
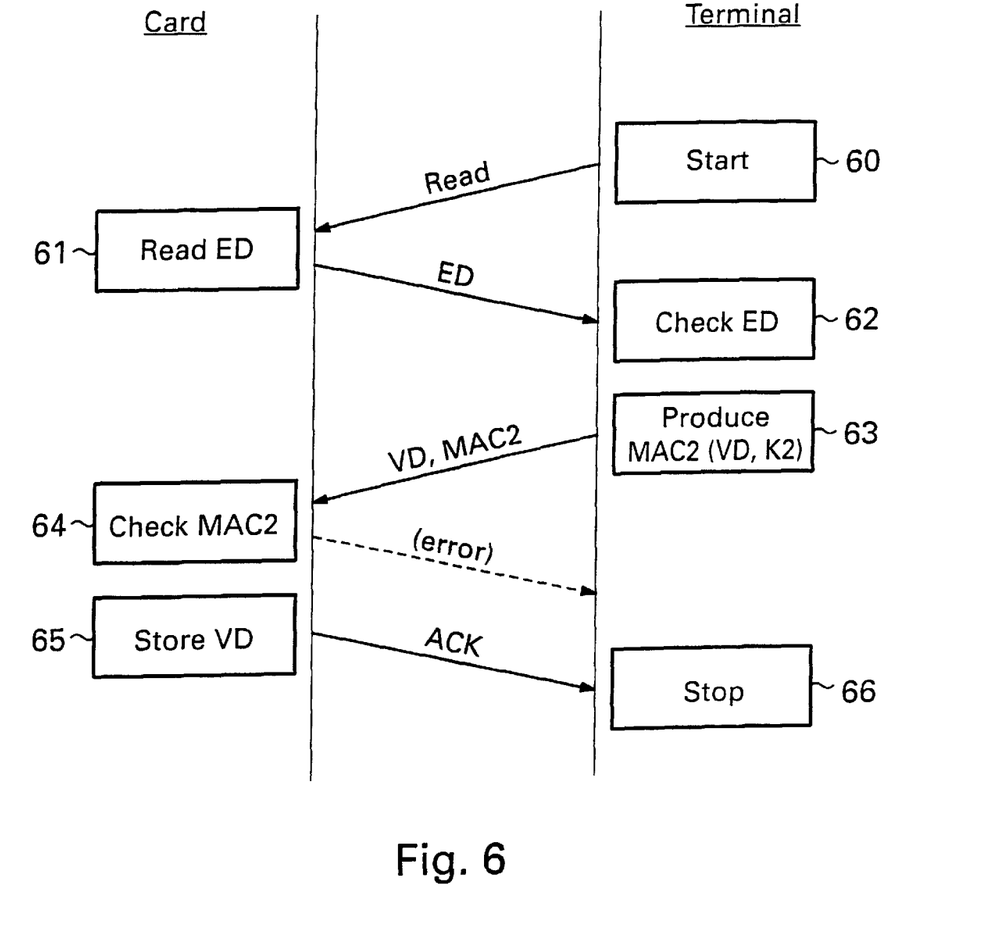
FIG. 6 is a timing diagram showing the timing for the validation of a ticket, according to the present invention.
Figure 7:
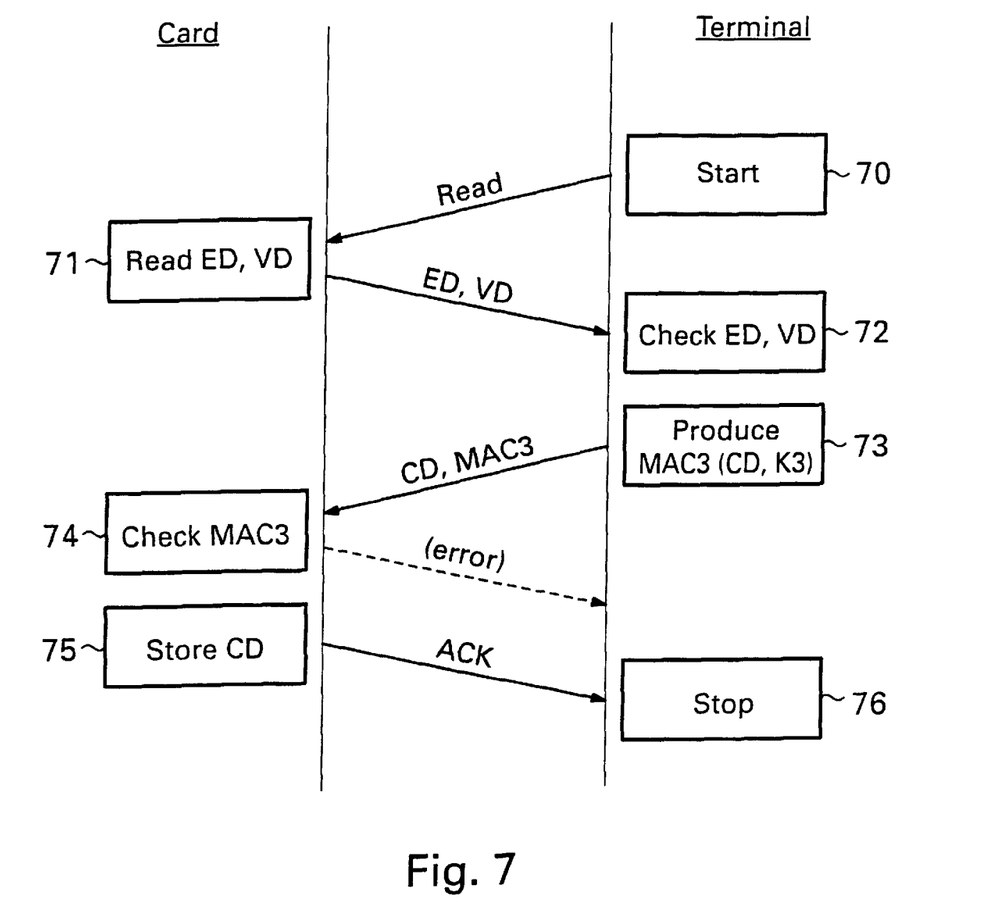
FIG. 7 is a timing diagram showing the timing for the verification of a ticket, according to the present invention.

The method of the invention, as depicted schematically and by way of example in FIGS. 5, 6 and 7, involves providing a ticket comprising three stages: a first stage (issuance) shown in FIG. 5, a second stage (validation) shown in FIG. 6, and a third stage (verification) shown in FIG. 7. Subsequent events are shown from top to bottom in FIGS. 5–7. It is assumed that the memory of the smart card is initialized beforehand, e.g. by providing empty tickets containing code words having all ones.

As shown in FIG. 5, the issuance stage begins with a first (start) step 50 in which the issuing terminal is activated, for example, by the insertion of the card into a terminal. In the subsequent step 51, the ticket count is checked (e.g., it is determined whether the terminal is permitted to issue another ticket). The ticket count may be limited to, for example, a maximum number of tickets per day and may be reset daily.

If the ticket count is not exceeded, the method continues to step 52, at which time the terminal requests a random number from the smart card. In response, at step 53, the smart card produces a random number (R) by means of, for example, a built-in random number generator, preferably implemented in software. The random number R is then transferred to the terminal.

In step 54, the terminal provides entitlement data (ED) as well as a first message authentication code (MAC1) derived from the entitlement data ED and the random number R using the first key K1. This authentication code MAC1 is checked by the card in step 55, for example, by deriving the MAC1 code from the entitlement data ED and the random number R and comparing the received and derived authentication codes. If the derived MAC1 code is found to be invalid the procedure is, for example, terminated and an error message is sent to the terminal. Note that the verification of the authentication code MAC1 implicitly involves the verification of the first key K1. A failed verification thus inhibits the use of the first write command (UPDATE).

If the code MAC1 is found to be valid, the entitlement data ED is stored in the card in step 56 using the first write command (UPDATE). Also, the remaining fields of the ticket (validation and verification fields) are reset using the write command (UPDATE). An acknowledge message (ACK) is sent to the terminal. Also, proper codes (e.g., all ones) may be written into the validation and entitlement fields. The issuance stage ends in step 57 and, for example, a suitable message is displayed on the terminal.

As shown in FIG. 6, the second or validation stage begins in step 60, in which the validation terminal is activated, for example, by insertion of the card in the terminal. The terminal sends a read command to the card. The read command may contain data specifying a certain ticket or a certain type of ticket. In step 61, the card subsequently reads the specified ticket(s), or alternatively all non-empty tickets, and sends the entitlement data ED to the terminal. In step 62 the terminal checks the entitlement data for validity (e.g., by determining the number of set bits per code word). In addition, in step 61, the validation data (VD) of the ticket may also be sent. Since the validation data is still "empty" (i.e., all zeros) at this stage, it follows that the ticket in question needs to be validated.

If the entitlement data ED received by the terminal in step 62 identifies a ticket which is to be validated, in step 63, the terminal produces a second message authentication code MAC2 using the validation data VD and the second key K2, and sends the data VD and the MAC2 code to the card. In step 64, the card checks the received authentication MAC2 code, for example, as in step 55. If the authentication MAC2 code is found to be invalid, an error message may be sent to the terminal. If the MAC2 code is found to be valid, in step 65, the validation data VD is stored in the ticket in question using the second write command (WRITE) and an acknowledge signal (ACK) is sent to the terminal. Step 66 concludes the validation stage. Note that if the validation (second) terminal does not possess the second key K2, it is not possible to use the first write command (UPDATE) at this stage at the (second) terminal.

The verification stage, shown in FIG. 7, begins in step 70 when the terminal, upon being activated, generates a read command. Again, this read command (which need not be identical to the read command of step 60) may indicate a certain ticket or the type of ticket. In step 71, the card reads the relevant entitlement data ED and validation data VD from memory in response to the read command and sends this data to the terminal. The terminal subsequently verifies this data in step 72, based upon verification or check data CD indicating which tickets are to be found valid (e.g., depending on the particular time and date). If the ticket in question is found valid, in step 73, a third message identification code (MAC3) is produced using the verification data CD and the third key K3. In step 73, the CD amd MAC3 codes are sent to the card from the terminal and are checked by the card in step 74. Finally, in step 75, the verification data CD is stored in a verification field of the card and the card sends an acknowledge message (ACK) to the terminal. In step 76, the verification terminal is, for example, deactivated concluding the verification stage.

Figure 8:
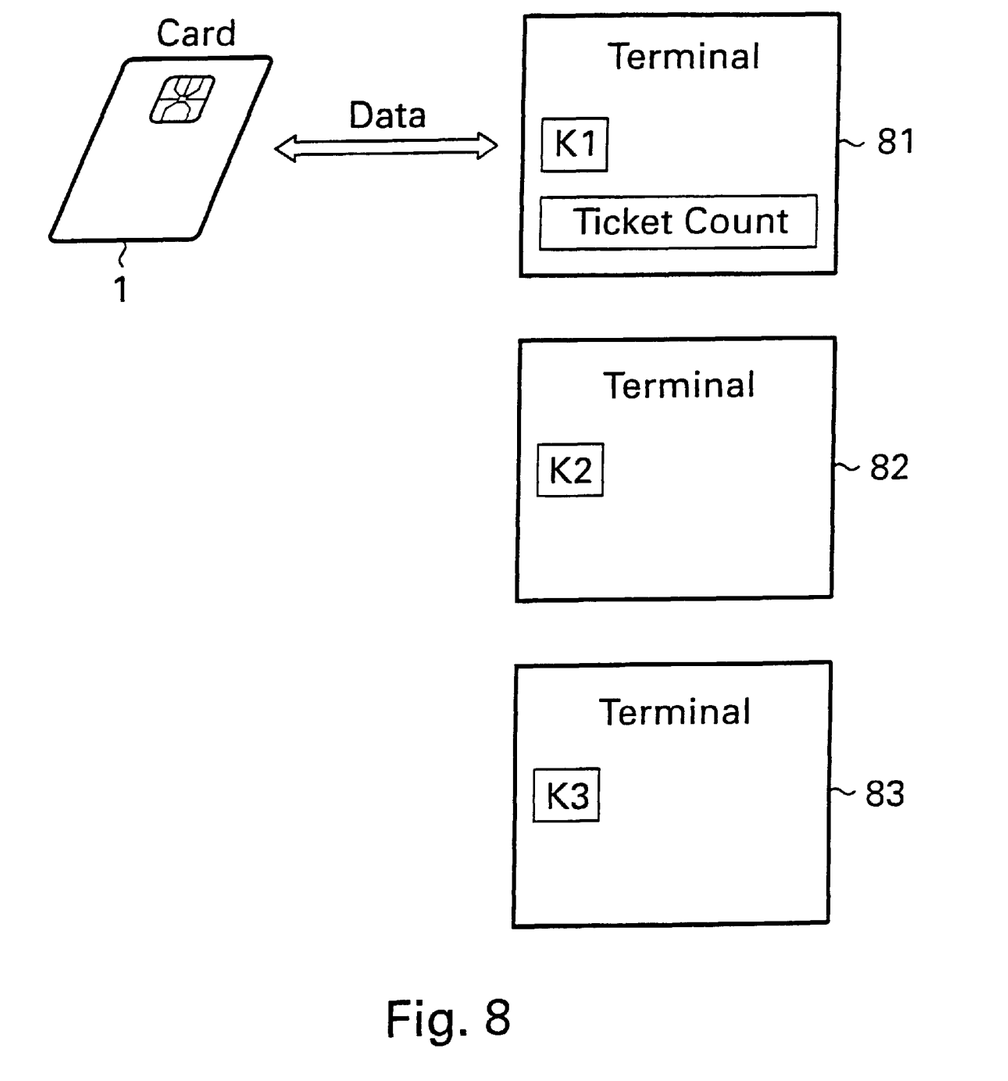
FIG. 8 is a system diagram, according to the present invention.

The system, according to the present invention, is schematically represented in the block diagram of FIG. 8. The system includes a first terminal 81, a second terminal 82, and a third terminal 83, as well as a smart card 1. The first terminal 81 is equipped for issuing tickets. To this end, the first key K1 is stored in the first terminal 81. The first terminal 81 also comprises a ticket counter for limiting the number of issued tickets to a predetermined amount.

The second terminal 82 is equipped for validating tickets, while the third terminal 83 is equipped for verifying tickets. The terminals 82 and 83 contain the second key K2 and the third key K3, respectively. The terminals 81–83 receive input from users and/or operators and may comprise a single terminal in some applications.

The present invention includes a computer program product, for implementing the processes of the present invention (e.g., as shown in FIGS. 4 and 5–7), which may be on a storage medium including instructions and/or data structures (e.g., as shown in FIG. 3) which can be used to program the integrated circuit 10 (FIGS. 1 and 2) to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions (e.g., the RAM/ROM 12 or external memory devices, not shown). However, this invention may be implemented by the preparation of application specific integrated circuits or by interconnecting an appropriate network of conventional component circuits, as will be readily apparent to those skilled in the art.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A smart card, comprising:
    an integrated circuit, including,
        a processor,
        wherein the processor is configured to respond to a first command for setting and resetting bits, and a second command for only setting bits, the first command being operational exclusively in response to an identification of a first type of terminal, and
    a memory, including,
        a ticket stored in the memory having at least one field for storing data relating to the ticket;
        wherein the smart card is configured for storing data using a code containing a fixed number of set bits per group of bits.

2. The smart card according to claim 1, wherein the code comprises code words having eight bits, the number of set bits in each valid code word equaling four.

3. The smart card according to claim 1, wherein the ticket stored in the memory comprises an entitlement field for storing data relating to the entitlement of the ticket, and a validation field for storing data relating to the validity of the ticket.

4. The smart card according to claim 3, wherein the ticket further comprises at least one verification field for storing data relating to a validity check of the ticket.

5. The smart card according to claim 3, wherein the integrated circuit includes a first key for authenticating entitlement data and a second key for authenticating validation data.

6. The smart card according to claim 5, wherein a ticket further comprises at least one verification field for storing data relating to a validity check of the ticket, and the integrated circuit further comprises a third key for authenticating verification data.

7. The smart card according to claim 6, wherein the second and the third keys are the same key.

8. The smart card according to claim 5, wherein the smart card is configured to identify the first type of terminal as a function of the first key.

9. A method of registering tickets on a smart card including a memory, comprising the steps of:
    creating a ticket in the memory, the ticket including at least one field;
    issuing the ticket by storing in the at least one field data identifying a right to be conveyed by the ticket;
    wherein the step of issuing the ticket comprises using a first command for setting and resetting bits, and a second command for only setting bits, the first command being operational exclusively in response to an identification of a first type of terminal; and
    storing the data in the at least one field using a code containing a fixed number of set bits per group of bits.

10. The method according to claim 9, wherein the step storing the data in the at least one field comprises storing a code having eight bits, the number of set bits in each valid code equaling four.

11. The method according to claim 9, further comprising the steps of:
    validating the ticket by storing in a validation field a validation code relating to the validity of the ticket; and
    verifying the ticket by storing in at least one verification field a verification code relating to a verification of the ticket;
    wherein the step of issuing the ticket comprises storing the data identifying the right to be conveyed by the ticket in an entitlement field.

12. The method according to claim 11, wherein the steps of validating and verifying comprise storing validation and verification codes each having eight bits with a number of set bits in each valid validation and verification code equaling four.

13. The method according to claim 12, wherein the step of verifying the ticket comprises the checking of the number of set bits in the verification code.

14. The method according to claim 11, the step of issuing the ticket comprises storing an identification of the issuer of the ticket in the entitlement field.

15. The method according to claim 11, wherein the step of validating the ticket comprises storing at least one of the date of validity of the ticket, and a terminal identification in the validation field as the validation code.

16. The method according to claim 11, wherein the step of verifying the ticket comprises storing at least one of a date, a time, and a terminal in the at least one verification field as the verification code.

17. The method according to claim 11, wherein the step of storing the data identifying the right to be conveyed in the entitlement field is performed as a function of a first key, and the step of validating the ticket by storing in the validation field the validation code relating to the validity of the ticket is performed as a function of a second key.

18. The method according to claim 17, wherein the step of verifying the ticket by storing in at least one verification field the verification code relating to the verification of the ticket is performed as a function of a third key.

19. The method according to claim 18, wherein the steps of verifying and validating comprise performing verification and validation using second and third keys that are a same key.

20. A system for providing access to services, comprising:
at least one smart card, including,
a memory for storing tickets comprising at least one field; and
at least one terminal including at least one of an issuing, validating, and verification terminal;
wherein the issuing terminal of the at least one terminal is configured to store in the at least one field data representing the right to access a service, and the data in the at least one field is stored using a code containing a fixed number of set bits per group of bits; and
wherein the smart card is configured to respond to a first command for setting and resetting bits, and a second command for only setting bits, the first command being operational exclusively in response to an identification of the issuing terminal.

21. The system according to claim 20, wherein the code comprises code words having eight bits, the number of set bits in each valid code word equaling four.

22. The system according to claim 20, wherein the at least one field includes an entitlement field, and a validation field, and the validation terminal of the at least one terminal is configured to store in the validation field data validating the at least one ticket.

23. The system according to claim 22, wherein the at least one field includes at least one verification field, and the verification terminal of the at least one terminal is configured to store in the at least one verification field data verifying the at least one ticket.

24. The system according to claim 20, wherein the issuing terminal of the at least one terminal is configured to limit the number of issued tickets.

* * * * *